US008065128B1

(12) United States Patent
Chase

(10) Patent No.: US 8,065,128 B1
(45) Date of Patent: Nov. 22, 2011

(54) METHODS AND APPARATUS FOR AUTOMATED TESTBENCH GENERATION

(75) Inventor: John R. Chase, San Jose, CA (US)

(73) Assignee: Altera Corporation, San Jose, CA (US)

(*) Notice: Subject to any disclaimer, the term of this patent is extended or adjusted under 35 U.S.C. 154(b) by 366 days.

(21) Appl. No.: 10/693,546

(22) Filed: Oct. 23, 2003

(51) Int. Cl.
G06F 17/50 (2006.01)
G06F 17/00 (2006.01)

(52) U.S. Cl. .......................................... 703/14; 716/104

(58) Field of Classification Search .................... 703/14; 717/104, 124, 135; 716/104
See application file for complete search history.

(56) References Cited

U.S. PATENT DOCUMENTS

| | | | | |
|---|---|---|---|---|
| 5,754,760 A * | 5/1998 | Warfield | .......................... | 714/38 |
| 5,805,795 A * | 9/1998 | Whitten | .......................... | 714/38 |
| 6,053,947 A * | 4/2000 | Parson | .............................. | 703/14 |
| 6,189,116 B1 * | 2/2001 | Mongan et al. | .................. | 714/38 |
| 6,269,467 B1 * | 7/2001 | Chang et al. | ................... | 716/104 |
| 6,334,207 B1 * | 12/2001 | Joly et al. | ......................... | 716/17 |
| 6,378,088 B1 * | 4/2002 | Mongan | .......................... | 714/39 |
| 6,477,691 B1 * | 11/2002 | Bergamashi Rab et al. | .... | 716/12 |
| 6,678,645 B1 * | 1/2004 | Rajsuman et al. | ................ | 703/20 |
| 6,907,550 B2 * | 6/2005 | Webster et al. | ................. | 714/47 |
| 7,085,702 B1 * | 8/2006 | Hwang et al. | ................... | 703/15 |
| 2002/0038401 A1 * | 3/2002 | Zaidi et al. | .................... | 710/305 |
| 2003/0139906 A1 * | 7/2003 | Barford | ......................... | 702/183 |
| 2004/0015739 A1 * | 1/2004 | Heinkel et al. | .................. | 714/37 |
| 2004/0015792 A1 * | 1/2004 | Kubista | ............................ | 716/4 |
| 2004/0210798 A1 * | 10/2004 | Higashi | ........................... | 714/27 |

OTHER PUBLICATIONS

Goossens et al. "Design of heterogeneous ICs for mobile and personal communication systems", Nov. 1994, Proceedings of the 1994 IEEE/ACM international conference on Computer-aided design, pp. 524-531.*
Altera Corp., "ASIC to FPGA Design Methodology & Guidelines" Jul. 2003, ver 1.0, pp. 1-58.*
Bening et al. "Optimizing Multiple EDA Tools within the ASIC Design Flow", 2001, IEEE, IEEE Design & Test of Computers, pp. 46-55.*
Dustin, Elfriede. "Chapter 7, Automated Testing Tools", Effective Software Testing: 50 Specific Ways to Improve Your Testing, Dec. 18, 2002, 6 pages.*
Hutton et al., "The Circuit Characterization and Generation Project at the University of Toronto", www.eecg.toronto.edu/~mdhutton/gen/ downloaded Sep. 8, 2003.
Synopsys Products & Solutions, Design Platforms, www.synopsys. com/products/products.html site modified Aug. 1, 2003, downloaded Sep. 8, 2003.

* cited by examiner

Primary Examiner — Kamini S Shah
Assistant Examiner — Suzanne Lo
(74) Attorney, Agent, or Firm — Weaver Austin Villeneuve and Sampson LLP

(57) ABSTRACT

Methods and apparatus are provided for efficiently generating designs for testing design automation tools and applications. Randomized and diverse test designs with realistic attributes are automatically generated to allow comprehensive testing of design automation tools such as synthesis, simulation, and place and route tools used to implement designs on electronic devices. Each test design can incorporate a wide range of attributes to allow thorough integration testing of a design automation tool.

27 Claims, 9 Drawing Sheets

METHODS AND APPARATUS FOR AUTOMATED TESTBENCH GENERATION

BACKGROUND OF THE INVENTION

1. Field of the Invention

The present invention relates to design automation tools. More specifically, the present invention relates to methods and apparatus for automatically generating designs for testing design automation tools such as synthesis, place and route, and simulation tools.

2. Description of the Prior Art

The increasing complexity of electronic devices has prompted logic designers to use a variety of design automation tools to assist in implementing designs on electronic devices such as programmable logic devices (PLDs), field programmable gate arrays (FPGAs), application specific integrated circuits (ASICs), digital signal processors (DSPs), and system on a chip devices (SOCs). In one example, designs are simulated using one tool and synthesized using another tool. In another example, an integrated platform includes a variety of tools, to perform synthesis, verification, and place and route operations. Because of the increasing complexity of electronic designs, the design automation tools used to implement the designs are also becoming increasingly complex.

However, the mechanisms for testing design automation tools are limited. In typical examples, limited sets of static test designs are provided to a design automation tool. The limited sets of test designs may not be sufficiently diverse to comprehensively test a design automation tool. Consequently, tools are often released to customers to allow customers to perform further beta testing and run through other possible scenarios that a design automation tool should be able to handle. However, having customers perform beta testing can often invoke the ire of well meaning users who may not be able to tell whether their own test design is faulty or the design automation tool itself is faulty. Furthermore, releasing tools that are not comprehensively tested may give the impression that an application or tool is not well developed. It is therefore desirable to provide improved methods and apparatus for comprehensively testing design automation tools and applications.

SUMMARY OF THE INVENTION

Methods and apparatus are provided for efficiently generating designs for testing design automation tools and applications. Randomized and diverse test designs with realistic attributes are automatically generated to allow comprehensive testing of design automation tools such as synthesis, simulation, and place and route tools used to implement designs on electronic devices. Each test design can incorporate a wide range of attributes to allow thorough integration testing of a design automation tool.

In one embodiment, a computerized method for generating a testbench is provided. A plurality of test designs are generated. The plurality of test designs have varied characteristics to allow substantial testing of a design automation tool. Generating one of the plurality of test designs includes instantiating the I/O structure of a top level module, parameterizing submodules from a design module library, and providing logic to interconnect the plurality of parameterized submodules. The top level module has input and output pins. The plurality of submodules from a design module library are parameterized for interconnection with the top level module. The plurality of submodules have input and output lines. Logic is provided to interconnect the plurality of parameterized submodules as well as to connect the plurality of parameterized submodules to various input and output pins of the top level module.

In another embodiment, a computer system for generating a testbench is provided. The computer system includes a processor and memory. The memory includes mechanisms for holding information associated with the library of modules. The processor is configured to generate a plurality of test designs. The plurality of test designs have varied characteristics to allow substantial testing of a design automation tool. Generating one of the plurality of test designs includes instantiating the I/O structure of a top level module, parameterizing submodules from a design module library, and providing logic to interconnect the plurality of parameterized submodules. The top level module has input and output pins. The plurality of submodules from a design module library are parameterized for interconnection with the top level module. The plurality of submodules have input and output lines. Logic is provided to interconnect the plurality of parameterized submodules as well as to connect the plurality of parameterized submodules to various input and output pins of the top level module.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1:
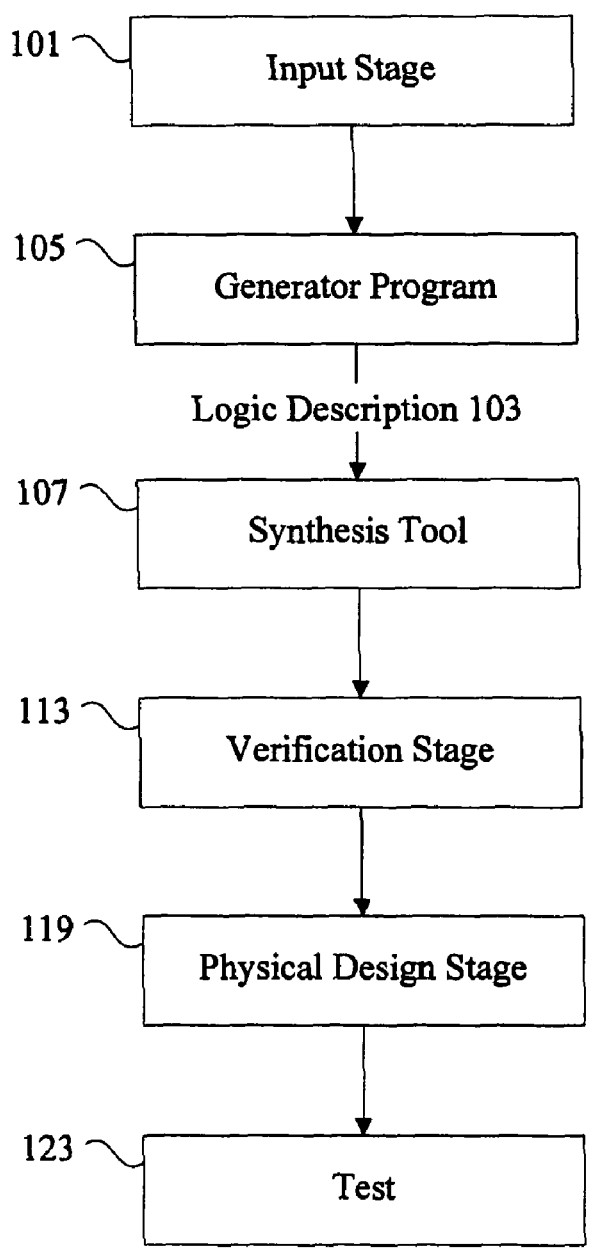
FIG. 1 is a diagrammatic representation showing the implementation of a target device.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular design automation tools including tools for logic synthesis and simulation.

However, it should be noted that the techniques of the present invention can be applied to a variety of tools and associated code provided to the tools. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The increased complexity of microelectronic technology has motivated the development of design automation technology. Design automation involves the use of computer applications and tools to conduct portions of product design and manufacturing of devices such as Application-Specific Integrated Circuits (ASICs), programmable chips including programmable logic devices (PLDs) and field programmable gate arrays (FPGAs), as well as System on a Chip (SOCs) and System on a Programmable Chip (SOPCs) devices. The process of designing, verifying, fabricating, and testing electronic devices, particularly ASICs, is time-consuming and expensive. Any flaw uncovered on a particular ASIC after fabrication is complete requires a vast amount of time and expense to correct.

Care is taken to use a variety of effective design automation tools to aid in the efficient development of electronic devices. Any mechanism or tool used to implement an electronic design on an electronic device is referred to herein as a design automation tool. Design automation tools can be any electronic design automation (EDA) tool including synthesis, place-and-route, timing analysis, simulation, and other verification tools. The increasing complexity of electronic devices has led to the increased complexity of the tools used to implement these electronic devices. Comprehensive testing of synthesis, place & route, and other EDA tools is often a difficult endeavor. Typically, a static set of "real world" HDL designs is assembled to form a testbench for the application under test, and more test designs are added to these testbenches as they become available.

There are several weaknesses to this approach. For example, a static testbench set often contains too small a number of test designs to sufficiently "span" the entire space of feasible designs. The number of static test designs in a testbench set is typically in the hundreds. In another example, the test designs may not be sufficiently "diverse" in their characteristics to adequately test the tool. Some hardware features or software assignments may not represented anywhere in the testbench. Techniques for efficiently obtaining a large number of diverse test designs integrating many hardware features and user assignments would be valuable.

The techniques of the present invention provide mechanisms for enabling users to generate a testbench having many diverse test designs. In one example, thousands of diverse test designs can be generated in a matter of minutes on a personal computer. The general characteristics of each test design, such as pin count & design size, can be controlled through user parameters, and application specific HDL components and design assignments can be incorporated. A large, diverse, and application specific test design set, which can span the entire feature set of the tested application, can be generated with little effort. The techniques of the present invention generate designs with realistic attributes and meaningful user assignments, resulting in a high probability of each design proceeding beyond the initial feasibility tests within the tested application. Furthermore, each generated design integrates many hardware features and user assignments, providing good integration testing.

FIG. 1 is a diagrammatic representation showing implementation of an electronic device using various design automation tools that can be tested using the mechanisms of the present invention. An input stage 101 receives selection information typically from a user for logic such as a processor as well as other components to be implemented on an electronic device. A generator program 105 creates a logic description 103 and provides the logic description 103 along with other customized logic to any of a variety of synthesis tools, place and route programs, and logic configuration tools to allow a logic description to be implemented on an electronic device.

In one example, an input stage 101 often allows selection and parameterization of components to be used on an electronic device. In some examples, components provided to an input stage include intellectual property functions, megafunctions, and intellectual property cores. The input stage 101 may be a graphical user interface using wizards for allowing efficient or convenient entry of information. The input stage may also be a text interface or a program reading a data file such as a spreadsheet, database table, or schematic to acquire selection information. The input stage 101 produces an output containing information about the various modules selected.

In typical implementations, the generator program 105 can identify the selections and generate a logic description with information for implementing the various modules. The generator program 105 can be a Perl script creating HDL files such as Verilog, Abel, VHDL, and AHDL files from the module information entered by a user. According to various embodiments, the generator program 105 also provides information to a synthesis tool 107 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 101, generator program 105, and synthesis tool 107 can be separate programs. The interface between the separate programs can be a database file, a log, or simply messages transmitted between the programs. For example, instead of writing a file to storage, the input stage 101 can send messages directly to the generator program 105 to allow the generator program to create a logic description. Similarly, the generator program can provide information directly to the synthesis tool instead of writing HDL files. Similarly, input stage 101, generator program 105, and synthesis tool 107 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 107.

A synthesis tool 107 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various Synthesized netlist formats will be appreciated by one of skill in the art.

A verification stage 113 typically follows the synthesis stage 107. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 113, the synthesized netlist file can be provided to physical design tools 119 including place and route and configuration tools. A place and route tool typically locates logic cells on specific logic elements of a target hardware device and connects wires between the inputs and outputs of the various logic elements in accordance with logic required to implement an electronic design. The device can also be physically tested at 123.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 101, the generator program 105, the synthesis tool 107, the verification tools 113, and physical design tools 119 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 2:
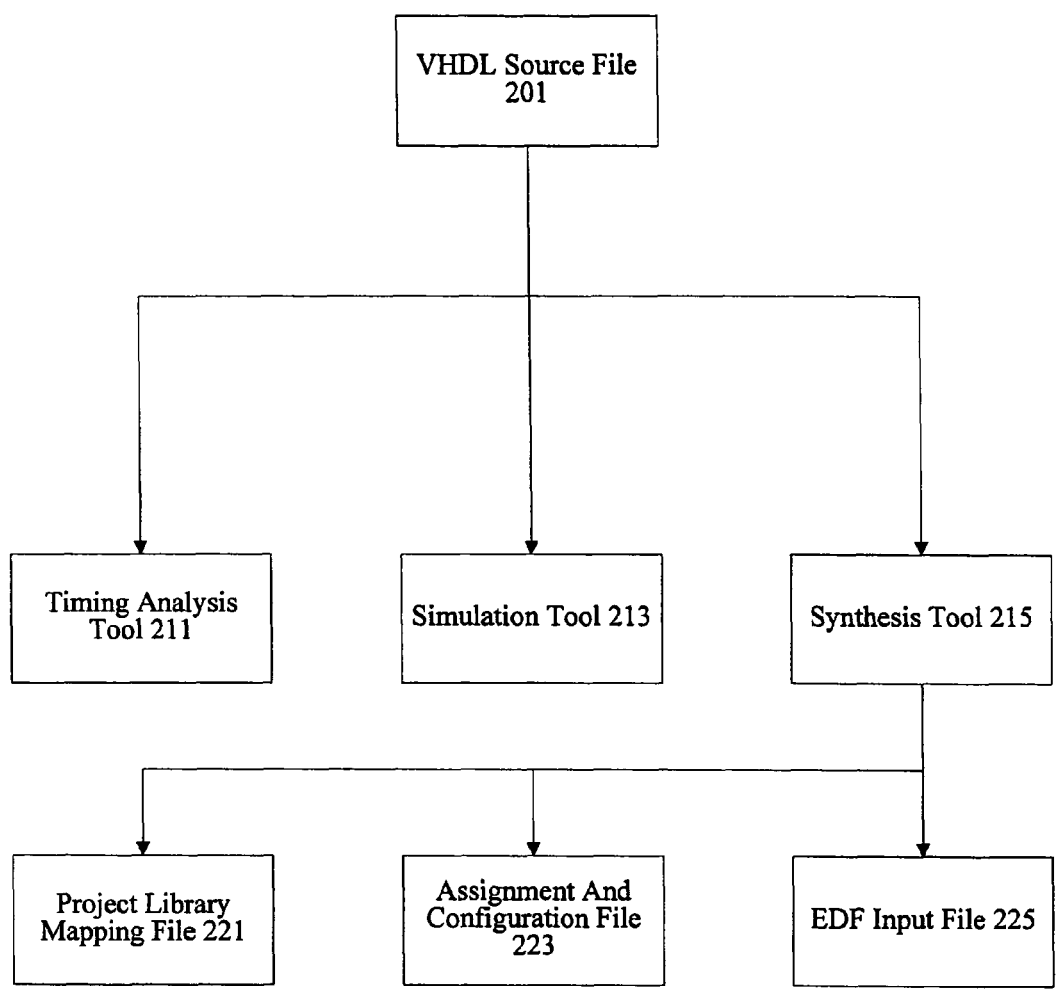
FIG. 2 is a diagrammatic representation showing various electronic design automation tools.

FIG. 2 is a diagrammatic representation showing more detailed processing associated with synthesis and simulation tools. According to various embodiments, an HDL design file such as a VHDL source file 201 is provided for both logic synthesis and simulation. The VHDL source file 201 may be provided to a synthesis timing analysis tool 211, simulation tool 213, and a synthesis tool 215.

The synthesis tool 215 takes the VHDL source file 201 and generates output information such as an EDF input file 225 for implementing the design on an electronic device. It should be noted that the synthesis tool 215 may also output other files such as assignment and configuration (ACF) files 223, as well as project library mapping (LMF) files 221. A variety of tools can be used to process available HDL design files.

Figure 3:
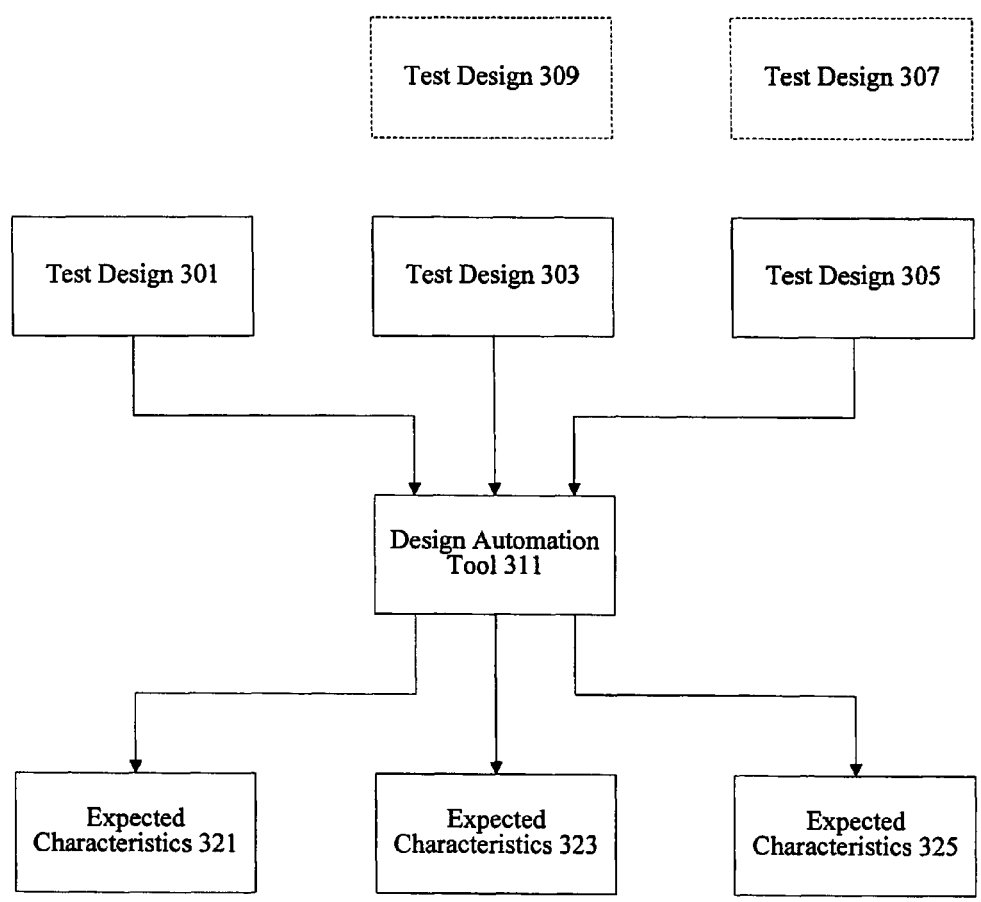
FIG. 3 is a diagrammatic representation showing typical mechanisms for testing design automation tools.

FIG. 3 is a diagrammatic representation showing a design automation tool under test. According to various embodiments, a design automation tool 311 such as a synthesis tool, a simulation tool, or place and route tool is provided with a static set of test designs. In one example, a few hundred test designs are provided to the design automation tool 311. Test design 301, test design 303, and test design 305 are entered into the design automation tool 311 and expected characteristics 321, 323, and 325 are sought. For example, if the characteristics output by the design automation tool 311 do not match expected characteristics 321, the designer is notified of possible defects in the design automation tool 311. Other test designs such as test design 309 and test design 307 are provided as they become available.

Providing test designs often requires that a designer think through the various types of inputs the design automation tool 311 should be able to handle. However, with the increasing complexity of design automation tools, a particular designer is often unable to thoroughly provide a complete testbench. Any set of test designs used to verify the operation of a design automation tool is referred to herein as a testbench. In many instances, keeping track of what has been tested what has not yet been tested is also monumental task. Very detailed test plans often have to be written with consideration provided to all of the various scenarios and design types that a tool should be able to handle.

Although testing of a design automation tool 311 can be conducted in this manner, there are possible alternative mechanisms for testing the design automation tool. In one example, randomized inputs and randomized logic can be provided to a design automation tool 311. However, randomized logic or randomized inputs may not accurately reflect real world designs and may still be provided to a tool. Resources would then have to be devoted to developing or correcting a design automation tool to handle even these nonreal world situations. Consequently, techniques of the present invention provide mechanisms for providing design automation tools with a large and diverse set of real world test designs. The test designs can be randomly generated yet include sufficient operability to test various mechanisms supported by the design automation tool 311.

Figure 4:
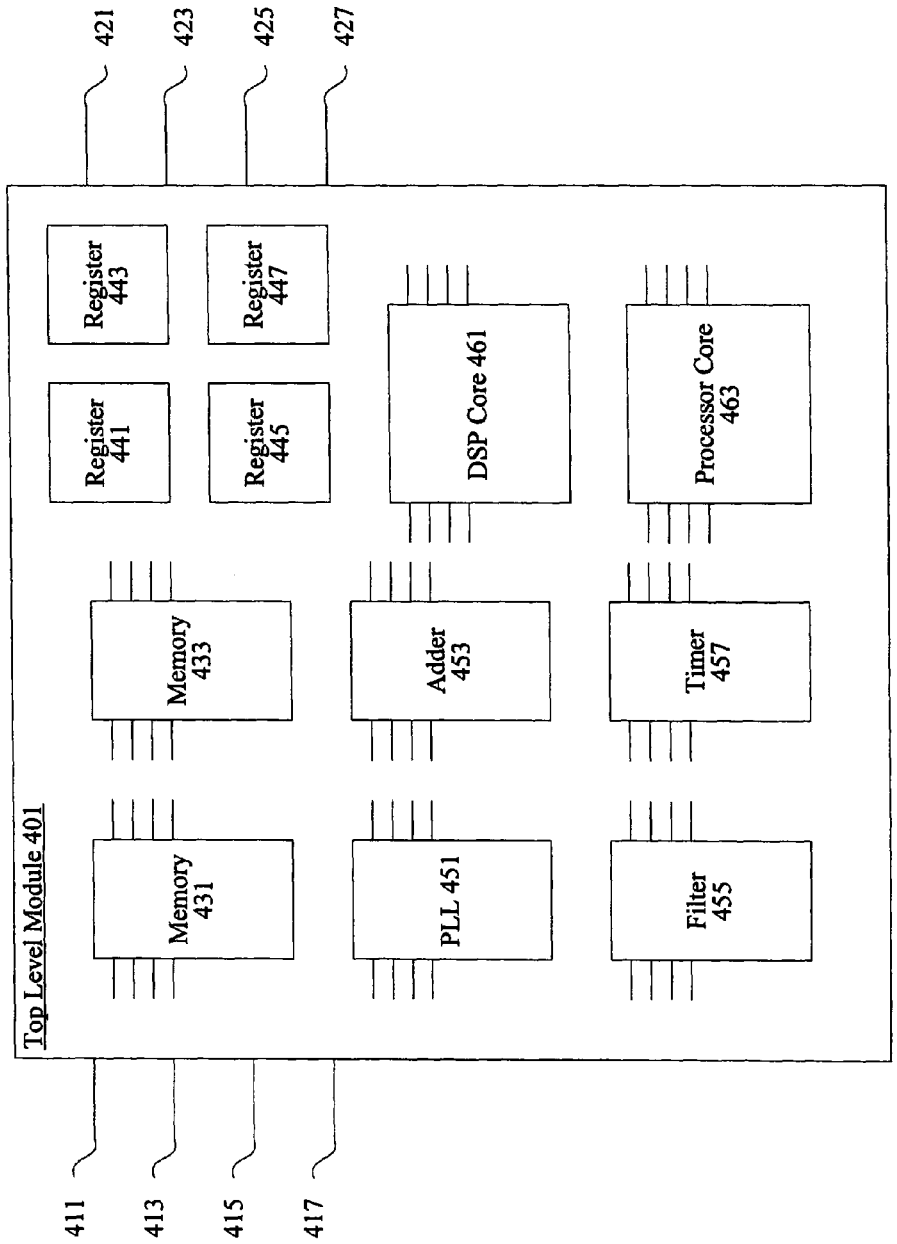
FIG. 4 is a diagrammatic representation showing a test design having a plurality of modules.

FIG. 4 is a diagrammatic representation showing a one example of a test design. An electronic device such as an ASIC, programmable chip, a system on a programmable chip, or system of chip, can be represented using various modules. Electronic device top-level module 401 includes various inputs and outputs such as 411, 413, 415, 417 and 421, 423, 425, and 427. Any module having the top-level input and output interface is referred to herein as the top-level module. Each top-level module includes a variety of submodules. Possible submodules include memory modules 431 and 433, phase locked loop module 451, adder 453, filter 455, and timer 457. The top-level module 401 also includes registers 441, 443, 445, and 447. In this example, other submodules included in the top-level module 401 are DSP core 461, processor core 463, etc. Each submodule may also be associated with various input and output lines. The various input and output lines can be categorized as clock lines, control lines, or data lines.

In many real world examples, the various input lines of the top-level module and the submodules would be interconnected with design functionality to allow performance of particular tasks. The techniques of the present invention, allow randomized interconnectivity and randomized functionality while maintaining real world constraints. A variety of different submodules can be selected for implementation as an electronic device. The various submodules can be interconnected in a variety of manners using techniques of the present invention.

Figure 5:
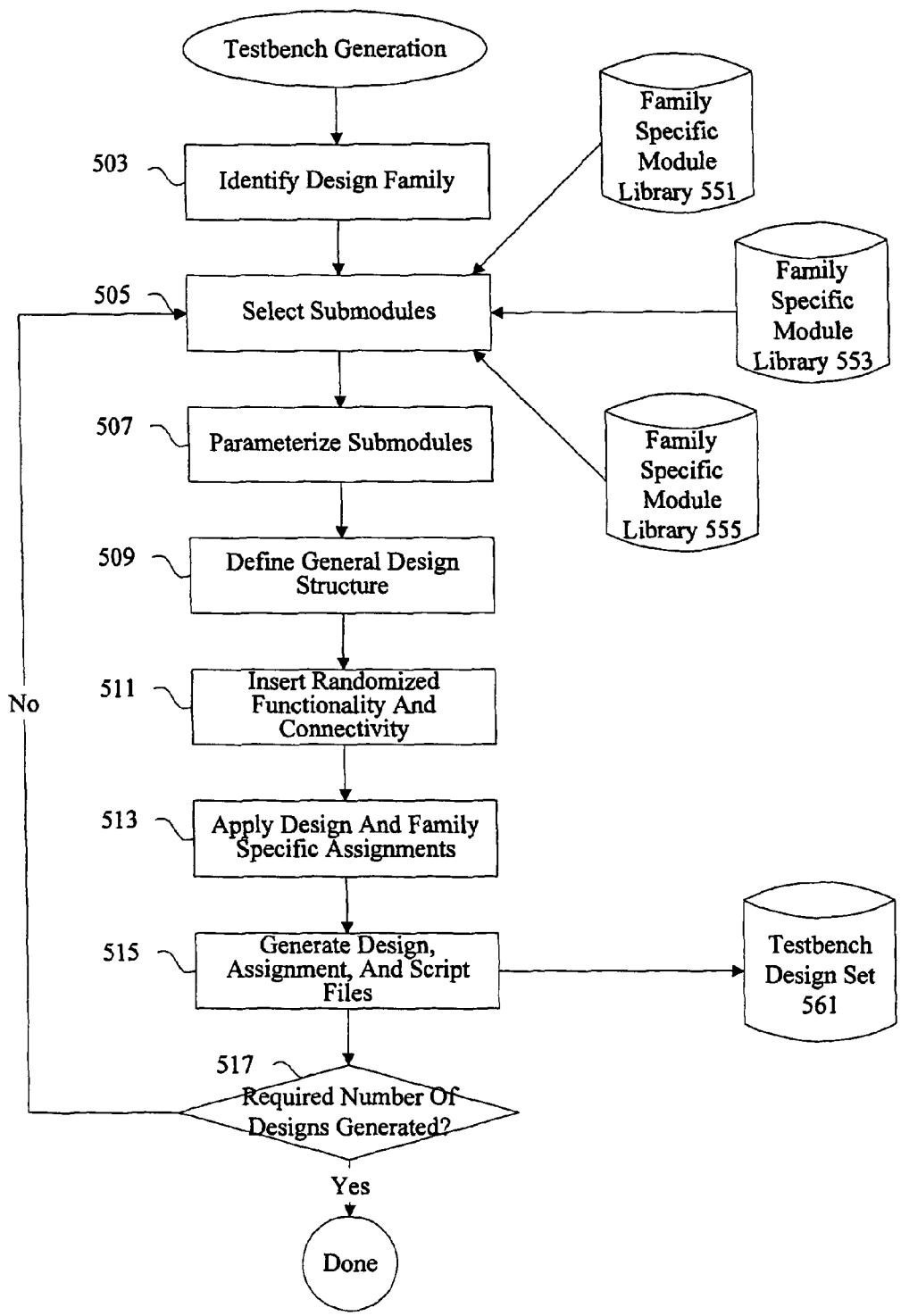
FIG. 5 is a process flow diagram showing a technique for design testbench generation.

FIG. 5 is a process flow diagram showing one example of a technique for testbench generation. The process flow will allow generation of an HDL design testbench of user specified size for stress testing of synthesis, place and route, and other EDA applications. Any tool being tested by the generated testbench is referred to herein as the tested tool/application or tool/application under test. According to various embodiments, generated test designs are randomized using randomly generated HDL and connectivity in the top design module, resulting in a very wide range of design functionality over the entire testbench. The test design can include user supplied design HDL submodules as well as generic submodules.

In many examples, user specified classes of assignments are applied to design elements in a random but meaningful way. As the user supplied modules may instantiate hardware components (such as RAM, PLLs, etc), the user specified classes of assignments can range over the entire set of assignments recognized by the tested application, and the randomly generated HDL in the top level design module and submodules can exercise a wide range of synthesis functionality of the tested application. The resulting design testbench set can comprehensively test a variety of applications and tools. Furthermore, each generated design can integrate many hardware features and user assignments, providing good integration testing.

A user no longer has to specify or create specific test designs. Instead, the user now can enter a set of parameters and the techniques of the present invention will automatically generate a randomized but meaningful set of test designs. According to various embodiments, a user enters the number of designs to generate and a list of hardware families or classes from which a design family will be chosen along with probabilities associated with each family. The user can also enter basic parameters for design generation by family, such as general size or I/O structure.

The testbench generation process can then generate the testbench sequentially, so individual design generation gets looped over many times. The following is a more detailed description of the process of generating a single test design.

At 503, a design family is identified. According to various embodiments, a design automation tool under test typically supports implementation of a variety of electronic devices. For example, the design automation tool can support implementation of programmable logic on different classes of devices. Consequently, techniques of the present invention allow testing of the design automation tool for each of the various device classes or families. The tested application may model several hardware "families", and each design is customized for a particular family. In one example, the process randomly chooses a hardware family for the design, with the set of applicable families and their probabilities supplied by the user.

At 505, submodules are selected. According to various embodiments, family specific module libraries 551, 553, and 555 are provided to allow generation or selection of submodules. At 507, submodules are parameterized. Parameterizing submodules may entail selecting data widths or even clock speed of a particular module. For example, a 4-bit adders can be selected or an 8-bit adder can be selected. At 509, the general design structure is defined to have a top-level module including submodules. According to various embodiments, defining the general structure entails setting I/O, clocking, control signal, and register structures within the top level module and instantiating the submodules. At 511, randomized functionality and connectivity is inserted to allow interoperability of the submodules and the top-level module.

At 513, design and family specific assignments are provided. According to various embodiments, the assignments are made randomly, but in a meaningful way. Assignment can include I/O standards, power up settings, placement constraints, etc. For example, I/O standard assignments are made to pins only, power up setting assignments are made to registers only, etc. The assignments are typically family specific. Certain I/O standards may only be supported in certain hardware families. At 515, design, assignment, and script files are generated and added to a test bench design set 561. At 517, it is determined if the required number of designs have been generated. If the required number of designs has been generated, test bench generation is complete. Otherwise another test design is generated at 505 by selecting submodules.

Figure 6:
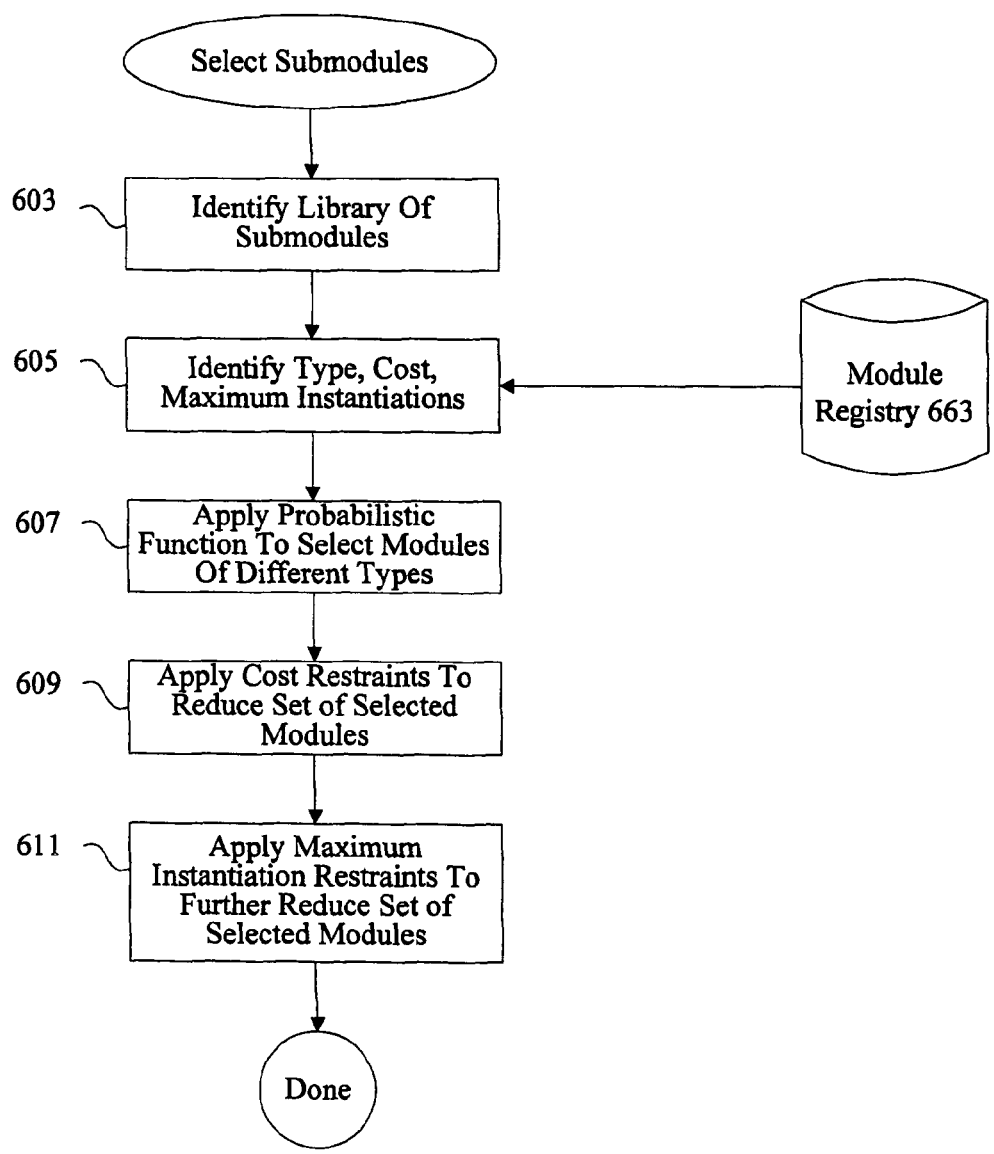
FIG. 6 is a process flow diagram showing selection of modules.

FIG. 6 is a process flow diagram showing one exemplary technique for selecting submodules. At 603, a library of submodules is identified. According to various embodiments, a library of submodules corresponds to a particular device class or device family. At 605, the type, cost, and maximum instantiation limitations are identified for the various modules. In many examples, the type, cost, and maximum instantiation information is included in a module registry 663. At 607, a probabilistic function is applied to select modules of different types from the library of submodules. For example, the user may specify that various memory modules have a 25 percent chance of being selected. A particular phase locked loop module may have a six percent chance of being selected. A probabilistic function is used to select particular submodules from the module library. At 609, cost constraints are applied as needed to reduce the set of selected modules. For example, if a device class supports only two kilobytes memory, no more than two kilobytes worth of memory modules will be selected. At 611, maximum instantiation constraints are applied to further reduce the set of selected modules. For example, a particular device may be limited to two DSP cores.

It should be noted that the techniques of this process flow or a variety of other process flows may be practiced in a variety of different sequences unless specifically noted. For example, cost constraints may be applied before particular modules are selected. Alternatively, cost constraints can be incorporated into the probabilistic function during selection of modules of different types. The techniques of the present invention contemplate a variety of mechanisms for selecting submodules while maintaining real world constraints for particular device families. In other examples, the number of pins or number of PLLs can be considered. The techniques of the present invention automatically and randomly assembles a set of available static submodules from a user supplied submodule library so that the assembled modules have characteristics that remain within hardware constraints. For example, if RAM modules A, B, C, D, and E are in the library and are applicable to the design, each of which are 1K in size, but the device can only implement 2K of RAM, then the process will randomly choose two of the submodules.

From those two, all, one, or none may be instantiated in the resulting design. This ensures that each design makes sense in that it will not be an unrealistic design for the tested hardware family. Any design having realistic characteristics that can be implemented on a target electronic device is referred to herein as a design having real world characteristics.

Figure 7:
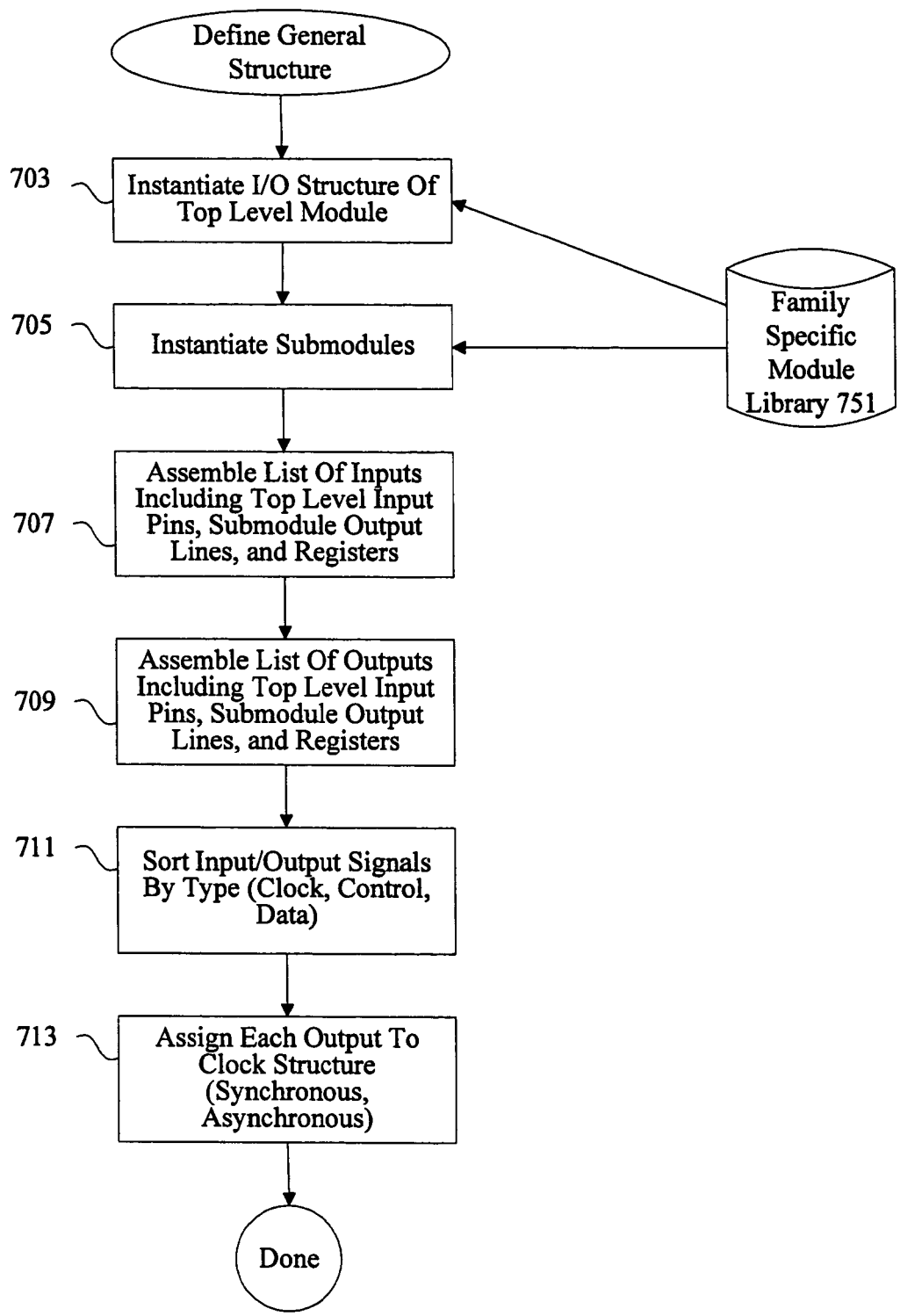
FIG. 7 is a process flow diagram showing module instantiation.

FIG. 7 is a process flow diagram showing one example of a technique for defining the general structure of a test design. Defining the general structure of a test design typically entails determining the I/O, clocking, control signal, and register structure within the top level HDL module and instantiating randomized submodules. At 703 the input and output structure of the top-level module is instantiated. At 705, selected submodules are instantiated. According to various embodiments, the top-level module as well as submodules are obtained from a family specific module library 751. At 707, a list of inputs including top-level input pins, submodule output lines, and registers is assembled.

Input pins of the top-level module, submodule output lines, and registers are referred to herein as inputs. At 709, list of outputs including top-level output pins, submodule input lines, and registers is assembled. Output pins of the top-level module, submodule input lines, and registers are referred to herein as outputs. Outputs are driven by various expressions performed on inputs. That is, random functionality and connectivity is implemented by generating random logical and arithmetic HDL expressions and assigning the resulting outputs to registers, output pins, or inputs of submodules. The arguments of these random expressions may be input pins, registers, submodule outputs, or random constants.

At 711, the outputs and inputs are sorted by type. For example, the input and output signals can be sorted into three separate categories, clock signals, control signals, and data signals. At 713, each output is assigned a particular clock structure. According to various embodiments, clock structures are randomly assigned to allow a variety of outputs to have not only different clock domains but different clock structures. In some examples, some outputs are assigned to synchronous clock structures while other outputs are assigned to asynchronous clock structures to allow more effective testing of a design automation tool.

Figure 8:
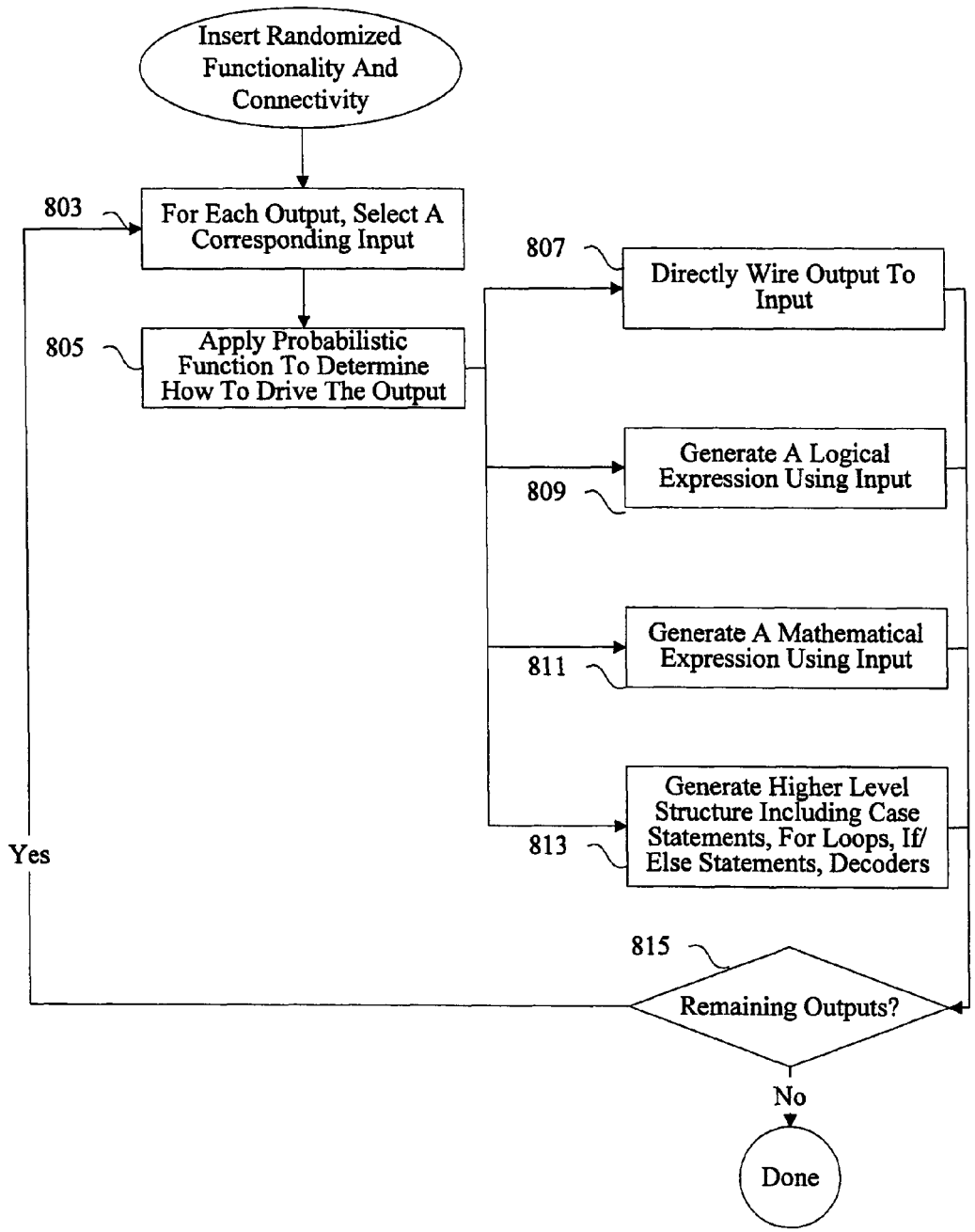
FIG. 8 is a process flow diagram showing generation of randomized functionality.

FIG. 8 is a process flow diagram showing one example of a technique for inserting randomized functionality and conductivity. At 803, the corresponding input is selected for each output. At 805, the probabilistic function is applied to determine how to drive the output. In some examples, output is directly wired to an input at 807. For example, the sub module input line may be directly wired to a top-level input pins. In another example, the top-level output pins can be directly wired to register. In still another example, the top-level output pins can be wired to a top-level input pin. A probabilistic function may also determine that each output should be driven using a logical expression operation and the corresponding input at 809. In another example, the output can be driven using a mathematical expression operation and the corresponding input at 811.

In still another example, a higher level structure including case statements, for loops, if else statements, and decoders can be used to drive a particular output at 813. At 815, it is determined if there are remaining outputs. If there are remaining outputs, process flow continues to 803 to select another corresponding input. If there are no remaining outputs, the process flow is complete. The techniques of the present invention for allowing tool-specific code processing by multiple tools can be implemented on a variety of computer systems.

Figure 9:
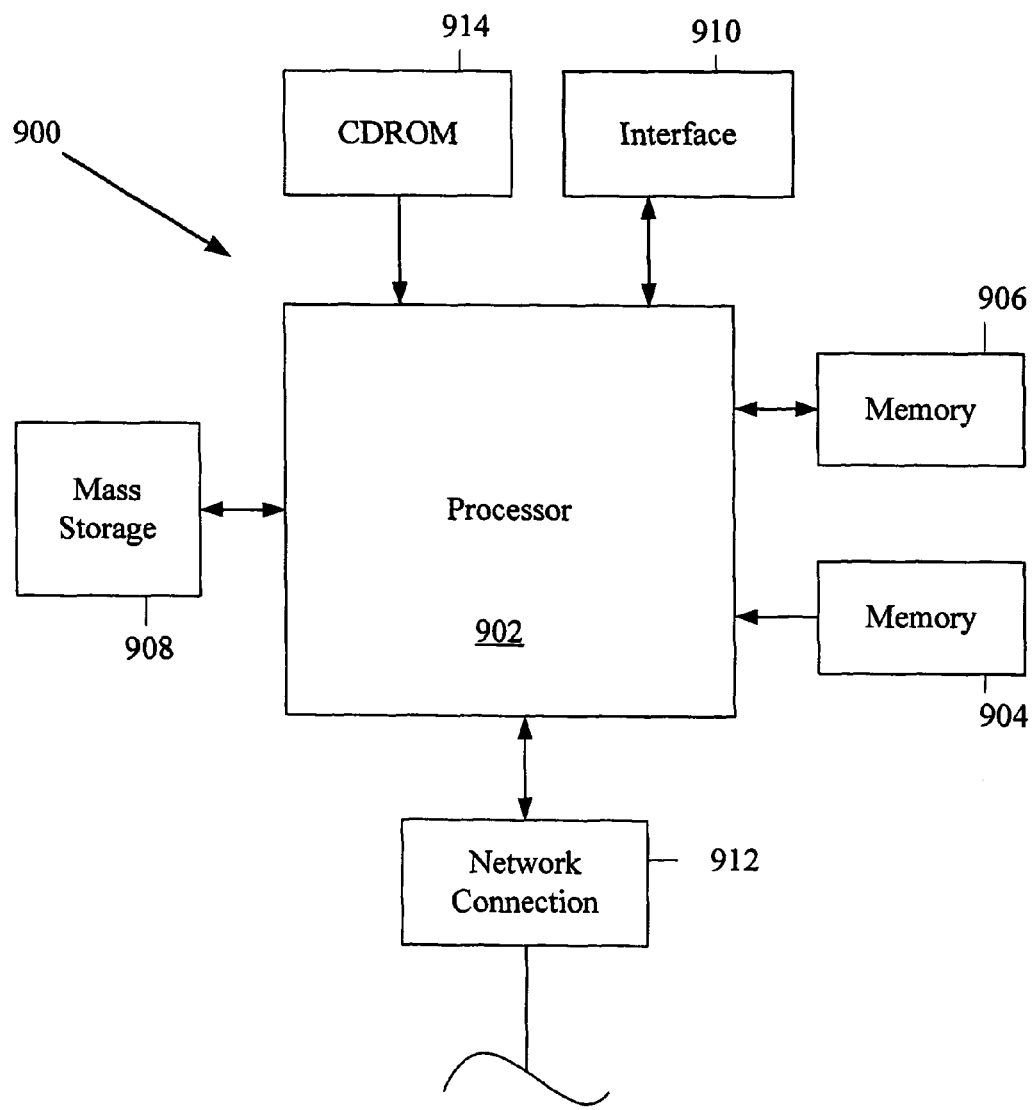
FIG. 9 is a diagrammatic representation of a computer system that can be used to implement testbench generation.

FIG. 9 illustrates a typical computer system that can be used to implement a programmable chip in accordance with an embodiment of the present invention. The computer system 900 includes any number of processors 902 (also referred to as central processing units, or CPUs) that are coupled to devices including memory 906 (typically a random access memory, or "RAM"), memory 904 (typically a read only memory, or "ROM"). The processors 902 can be configured to generate a testbench for a particular design automation tool. As is well known in the art, memory 904 acts to transfer data and instructions uni-directionally to the CPU and memory 906 is used typically to transfer data and instructions in a bi-directional manner.

Both of these memory devices may include any suitable type of the computer-readable media described above. A mass storage device 908 is also coupled bi-directionally to CPU 902 and provides additional data storage capacity and may include any of the computer-readable media described above. The mass storage device 908 may be used to store programs, data and the like and is typically a secondary storage medium such as a hard disk that is slower than memory. The mass storage device 908 can be used to hold a library or database of prepackaged logic or intellectual property functions, as well as information on generating particular configurations. It will be appreciated that the information retained within the mass storage device 908, may, in appropriate cases, be incorporated in standard fashion as part of memory 906 as virtual memory. A specific mass storage device such as a CD-ROM 914 may also pass data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Video monitors can be used to display wizards and subwizards to a user. Finally, CPU 902 optionally may be coupled to a computer or telecommunications network using a network connection as shown generally at 912. With such a network connection, it is contemplated that the CPU might receive information from the network, or might output information to the network in the course of performing the above-described method steps. It should be noted that the system 900 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 908 or 914 and executed on CPU 908 in conjunction with primary memory 906.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, various aspects described above may be implemented using firmware, software, or hardware. Aspects of the present invention may be employed with a variety of different file formats, languages, and communication protocols and should not be restricted to the ones mentioned above. In one example, the techniques of the present invention could be applied to any design automation tool. Therefore, the scope of the invention should be determined with reference to the appended claims.

What is claimed is:

1. A method comprising:
Generating a plurality of test designs associated with a design automation tool, wherein the plurality of test designs comprises a module, wherein said generating the plurality of test designs comprises:
(a) instantiating an input/output (I/O) structure of the module having input and output pins;
(b) applying a function to select a plurality of submodules from a design module library, wherein the plurality of submodules comprises input and output lines, wherein the plurality of submodules is located within the module;
(c) parameterizing the plurality of submodules from the design module library for interconnection with the module;
(d) interconnecting the lines of the plurality of parameterized submodules based on a selection of a particular type of interconnect from a plurality of interconnect types, wherein the selection of the particular type of interconnect is based on a probabilistic function and wherein the plurality of interconnect types includes an interconnect having a mathematical expression, an interconnect having conditional logic, or a direct interconnect; and
(e) connecting the plurality of parameterized submodules to the input and output pins of the module.

2. The method of claim 1, further comprising:
determining whether a predetermined number of the test designs for testing the design automation tool has been generated; and
applying the plurality of test designs to test the design automation tool.

3. The method of claim 1, further comprising receiving the probabilistic function from a user, wherein the probabilistic function comprises a probability of selecting one of the submodules from the plurality of submodules.

4. The method of claim 1, wherein the design automation tool is used to implement hardware descriptor language designs on a programmable chip.

5. The method of claim 1, wherein the plurality of submodules comprises a memory module and a Digital Signal Processor (DSP) core.

6. The method of claim 1, further comprising applying a plurality of instantiation constraints to select the plurality of submodules.

7. The method of claim 1, wherein the design automation tool is a synthesis or a place and route tool.

8. The method of claim 1, further comprising identifying a plurality of inputs, wherein the inputs identified comprise the input pins of the module, one of the output lines of one of the parameterized submodules, and registers.

9. The method of claim 8, further comprising identifying a plurality of outputs, wherein the outputs identified comprise the output pins of the module, one of the input lines of one of the parameterized submodules, and registers.

10. The method of claim 9, further comprising classifying the inputs and outputs identified as clock lines, control lines, and data lines.

11. The method of claim 1, wherein parameterizing the plurality of submodules comprises defining interfaces, data widths, and the types of signals for one of the input lines and one of the output lines associated with one of the parameterized submodules.

12. The method of claim 1, wherein the submodules comprise adders, phase lock loops, memory, and timers.

13. The method of claim 10, wherein one of the test designs further comprises a clock structure for one of the outputs.

14. The method of claim 13, wherein the clock structure includes a synchronous and or an asynchronous structure.

15. The method of claim 2, further comprising selecting a plurality of submodules upon said determining that the predetermined number of the test designs is not generated.

16. A computer system comprising:
a memory configured to hold information associated with a design module library; and
a processor coupled to the memory, wherein said processor is configured to generate a plurality of test designs associated with a design automation tool, wherein the plurality of test designs comprises a module, said processor is configured to:
(a) instantiate an input/output (I/O) structure of the module having input and output pins;
(b) apply a function to select a plurality of submodules from the design module library, wherein the plurality of submodules includes a plurality of input and output lines, wherein the plurality of submodules is located within the module;
(c) parameterize the plurality of submodules from the design module library for interconnection with the module;
(d) interconnect the lines of the plurality of parameterized submodules based on a selection of a particular type of interconnect from a plurality of interconnect types, wherein the selection of the particular type of interconnect is based on a probabilistic function and wherein the plurality of interconnect types includes an interconnect having a mathematical expression, an interconnect having conditional logic, or a direct interconnect; and
(e) connect the plurality of parameterized submodules to the input and output pins of the module.

17. The computer system of claim 16, wherein the processor is operable to determine whether a predetermined number of the test designs for testing the design automation tool has been generated, wherein the plurality of test designs are applied to test the design automation tool.

18. The computer system of claim 16, wherein the design automation tool is used to implement hardware descriptor language designs on a programmable chip.

19. The computer system of claim 16, wherein the design automation tool is used to implement designs on an ASIC.

20. The computer system of claim 16, wherein the design automation tool is an electronic design automation tool.

21. The computer system of claim 16, wherein the design automation tool is a synthesis or a place and route tool.

22. The computer system of claim 16, wherein said processor is operable to generate one of the test designs by identifying a plurality of inputs, wherein the plurality of inputs comprises the input pins of the top level module, one of the output lines of one of the parameterized submodules, and registers.

23. The computer system of claim 22, wherein said processor is configured to generate one of the test designs by identifying a plurality of outputs, wherein the outputs identified comprise the output pins of the module, one of the input lines of one of the parameterized submodules, and registers.

24. An apparatus comprising:
storage means for storing data design module library; and
processing means for generating a plurality of test designs associated with a design automation tool, wherein the plurality of test designs comprises a module, said processing means:
(a) for instantiating an input/output (I/O) structure of the module having input and output pins, (b) for applying a function to select a plurality of submodules having input and output lines from the design module library, wherein the plurality of submodules is located within the module, (c) for parameterizing the plurality of submodules from the design module library for interconnection with the module, (d) for interconnecting the lines of the plurality of parameterized submodules based on a selection of a particular type of interconnect from a plurality of interconnect types, wherein the selection of the particular type of interconnect is based on a probabilistic function and wherein the plurality of interconnect types includes an interconnect having a mathematical expression, an interconnect having conditional logic, or a direct interconnect; and (e) for connecting the plurality of parameterized submodules to the input and output pins of the module.

25. The apparatus of claim 24, wherein said processing means is further:
for determining whether a predetermined number of the test designs for testing the design automation tool has been generated, and
for repeating selecting a plurality of submodules from the design module library upon determining that the predetermined number of test designs is not generated.

26. The apparatus of claim 24, wherein the design automation tool is used to implement hardware descriptor language designs on a programmable chip.

27. The apparatus claim 24, wherein the design automation tool is used to implement designs on an ASIC.

* * * * *